(12) United States Patent
Kister et al.

(10) Patent No.: US 7,691,239 B2
(45) Date of Patent: Apr. 6, 2010

(54) DISTILLATION SYSTEMS

(75) Inventors: Henry Kister, Corona Del Mar, CA (US); Walt Stupin, Whittier, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 1121 days.

(21) Appl. No.: 10/535,613

(22) PCT Filed: Dec. 4, 2002

(86) PCT No.: PCT/US02/38552

§ 371 (c)(1),
(2), (4) Date: Jan. 12, 2006

(87) PCT Pub. No.: WO2004/052491

PCT Pub. Date: Jun. 24, 2004

(65) Prior Publication Data

US 2006/0137967 A1    Jun. 29, 2006

(51) Int. Cl.
*B01D 3/14* (2006.01)
*B01D 3/42* (2006.01)
*C07C 7/04* (2006.01)

(52) U.S. Cl. .................. 203/2; 196/111; 202/160; 203/3; 203/99; 203/DIG. 18; 203/DIG. 19; 208/347; 585/800

(58) Field of Classification Search ............... 196/111, 196/132, 141; 202/158, 160; 203/2, 3, 99, 203/100, DIG. 18, DIG. 19; 208/347, DIG. 1; 585/800
See application file for complete search history.

(56) References Cited

U.S. PATENT DOCUMENTS

| 4,358,346 | A | * | 11/1982 | Shinskey | 203/1 |
| 4,566,807 | A | * | 1/1986 | Koolen | 374/112 |
| 6,387,222 | B1 | * | 5/2002 | Tragut et al. | 203/2 |
| 6,558,515 | B1 | * | 5/2003 | Steacy | 203/1 |

* cited by examiner

*Primary Examiner*—Virginia Manoharan
(74) *Attorney, Agent, or Firm*—Fish & Associates, PC

(57) ABSTRACT

A differential vapor pressure (DYP) cell is disposed in a divided wall column that receives a feed comprising a first, second, and third component. A separation section on the feed side of the divided wall column separates the feed in a vapor comprising the first and second component, and a liquid comprising the second and third component. The DYP cell is disposed in the divided wall column at a level below the point where the feed enters the column, and the DYP cell measures the concentration of the first component.

10 Claims, 1 Drawing Sheet

DISTILLATION SYSTEMS

FIELD OF THE INVENTION

The field of the invention is monitoring and flow control of feed components in distillation columns, and especially in divided wall columns.

BACKGROUND OF THE INVENTION

Thermally coupled distillation and the concept of carrying out such a distillation in a single column with a dividing wall separating the feed side from the side product side have been known for a long time (see e.g., U.S. Pat. No. 2,295,256 to Brugma, U.S. Pat. No. 2,471,134 to Wright, and the paper by Triantafyllou and Smith [Design and optimization of fully thermally coupled distillation columns. Trans I. Chem. E, Vol 70, Part A (1992), pages 118-132]).

Divided wall columns typically have a configuration in which a vertical baffle in the middle section of the column separates the feed point from the point at which the intermediate boiling point product is withdrawn. In this way, the quantities of both light and heavy components in the feed reaching the side draw may be controlled at any specification (which is traditionally achieved in two conventional distillation steps). This allows for various advantages, including significant reduction of reboiler and condenser duties (e.g. up to 30% as compared to a two-column arrangement), and further reduces capital cost by reducing the number of required components.

Despite these and other advantages of employing a divided wall column for separation of at least ternary feeds, several aspects of these columns remain problematic. Among other things, identification of suitable properties that will adequately correlate with the desired separation on the feed side of the partition has been difficult for many years. For example, effective control and operation of a divided wall column typically requires adequate separation of the lights from the heavies on the feed side. If excess heavies rise to the top of the partition on the feed side, the intermediate product will be contaminated with heavies. If excess lights descend to the bottom of the partition on the feed side, the intermediate product will be contaminated with lights. Separation of the intermediate component is less problematic, since the intermediate component can distribute either way (i.e., to the top or bottom of the feed side column).

One method of achieving adequate separation of the lights from the heavies on the feed side includes use of temperature indicators/sensors to detect movements of lights towards the bottom of the feed side of the partition (Lights will be indicated by a drop in temperature). While temperature measurement is conceptually viable, temperature measurement is frequently limited to a scenario in which the concentration of lights has a significant effect on tray temperatures below the feed. Unfortunately, it is relatively common that the tray temperature is insensitive to the presence of lights, especially when the concentration of lights below the feed is relatively small.

To circumvent at least some of the problems associated with temperature indicators/sensors, analyzers may be used to detect the composition of the feed at a particular position in the divided wall column on the feed side. However, analyzers tend to be expensive, unreliable (at least in some cases), and frequently exhibit significant lag times, which adds further problems in tower control.

Although various methods and configurations for operation and monitoring of divided wall columns are known in the art, all or almost all of them suffer from one or more disadvantages. Therefore, there is still a need to provide improved methods and configurations for operation and monitoring of divided wall columns.

SUMMARY OF THE INVENTION

The present invention is directed to a divided wall column that receives a feed comprising at least a first component, a second component, and a third component, wherein a separation section on the feed side of the divided wall column separates the feed into a vapor that comprising the first and the second component, and a liquid comprising the second and the third component. Contemplated divided wall columns further include a differential vapor pressure cell disposed at a level below a point where the feed enters the column on the feed side, wherein the differential vapor pressure cell measures a concentration of the first component.

In one aspect of the inventive subject matter, the divided wall column further comprises a partition separating the feed side from a side product side, wherein the differential vapor pressure cell is positioned on the feed side below the point where the feed enters the column on the feed side and above the lower end of the partition. In preferred aspects, the differential vapor pressure cell comprises a reference substance that has a vapor pressure that is substantially identical to a predetermined vapor pressure of liquid on the feed side at a location where the differential vapor pressure cell is disposed.

In another aspect of the inventive subject matter, a control element is coupled to the divided wall column and receives a signal from the differential vapor pressure cell, wherein the control element regulates a process parameter (e.g., temperature) in the divided wall column. It is especially preferred that the control element regulates the process parameter when about 0.02% (mol) to about 5% (mol) of the first component is present at the location where the differential vapor pressure cell is positioned.

In a further aspect of the inventive subject matter, the feed comprises a hydrocarbonaceous feed, wherein the first component comprises a $C_4$-fraction, the second component comprises a $C_5$-fraction and the third component comprises a $C_6$-fraction. Contemplated divided wall columns may further comprise a second and a third separation section, wherein the second separation section receives the vapor that comprises the first and the second component and wherein the third separation section receives the liquid that comprises the second and the third component.

In a still further aspect of the inventive subject matter, a method of operating a plant comprises a step in which a divided wall column is provided that includes a separation section on the feed side that receives a feed comprising at least a first component, a second component, and a third component. In another step, the feed is separated in the separation section on the feed side into a vapor that comprises the first and the second component, and a liquid that comprises the second and the third component. In yet another step, a differential vapor pressure cell is coupled to the divided wall column at a level below a point where the feed enters the column on the feed side, and in a further step, a concentration of the first component is measured using the differential vapor pressure cell.

Various objects, features, aspects and advantages of the present invention will become more apparent from the following detailed description of preferred embodiments of the invention, along with the accompanying drawing.

DETAILED DESCRIPTION

Figure 1:
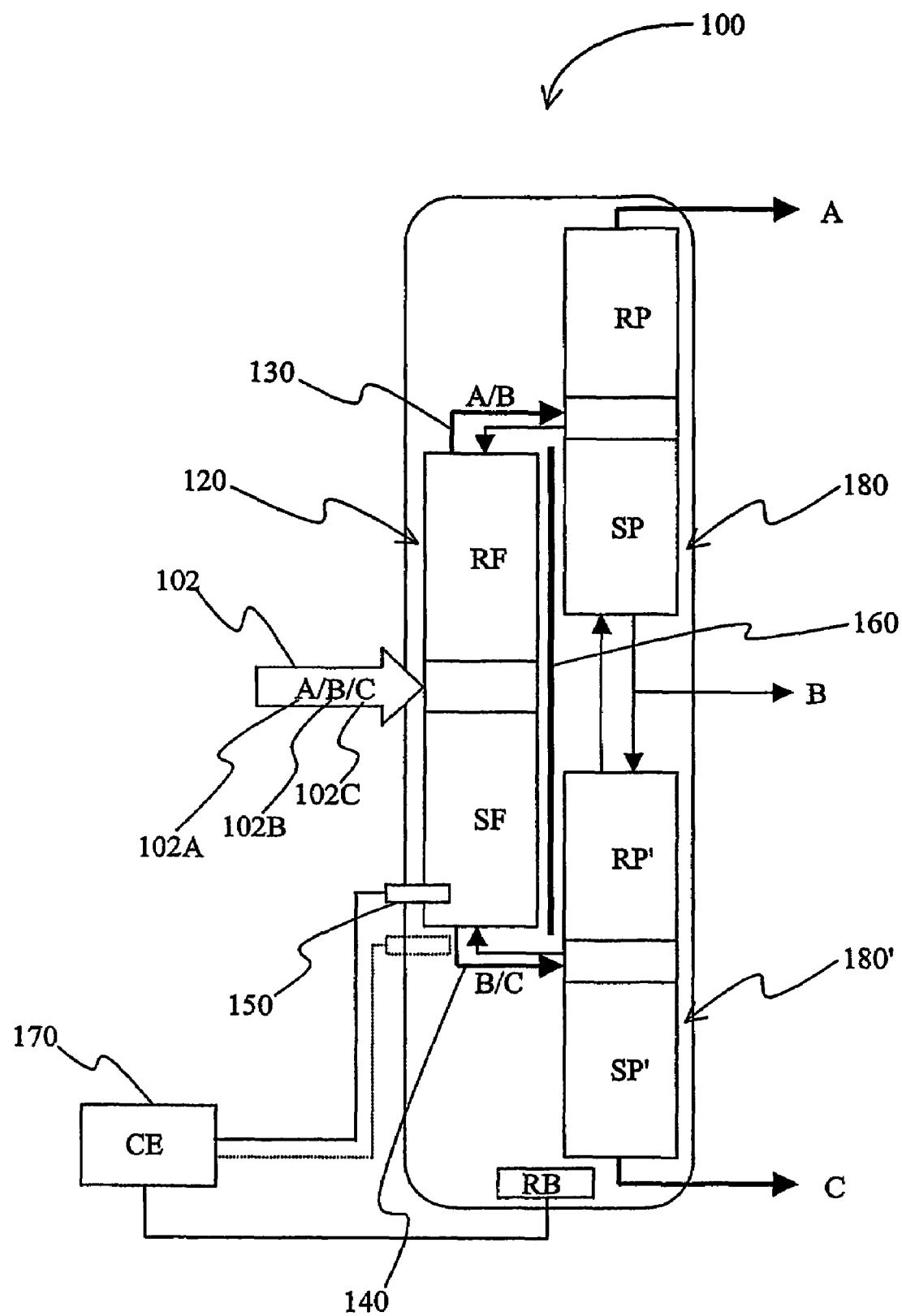
FIG. 1 is a schematic cross sectional side view of an exemplary divided wall column according to the inventive subject matter.

As used herein, the term "divided wall column" or "dividing wall column" refers to a distillation system for one or more multi-component feeds in which at least two, and more typically three thermally coupled distillation columns are disposed in a common shell and separate the multi-component feed into at least one light, at least one intermediate, and at least one heavy boiling fraction. Exemplary divided wall columns are described, for example, in U.S. Pat. No. 4,230,533 to Girox, or in a presentation by Becker et al. [The world's larges partitioned column with trays. *Linde Reports on Science and Technology* 62 (2000), pages 42-48] (infra).

The inventors have discovered that improved control over traffic of the light, intermediate, and/or heavy boiling fraction in a divided wall column (DWC) can be achieved by thermally coupling a differential vapor pressure (DVP) cell to the divided wall column. More specifically, the inventors contemplate that descent of excess lights on the feed side can be detected at concentrations and detection speed that is superior to previously known detection methods and configurations.

Consequently, a plant will therefore include a divided wall column that receives a feed comprising at least a first component, a second component, and a third component, wherein a separation section on the feed side of the divided wall column separates the feed into a vapor that comprises the first and the second component, and a liquid that comprises the second and the third component. A differential vapor pressure cell is thermally coupled (e.g. at least partially disposed) in the divided wall column at a level below the point where the feed enters the column on the feed side, wherein the differential vapor pressure cell measures a concentration of the first component.

FIG. 1 depicts an exemplary configuration of a contemplated divided wall column 100 into which a multi-component feed 102 is fed, wherein the multi-component feed comprises a first component A 102A (e.g., a light boiling fraction), a second component B 102B (e.g., an intermediate boiling fraction), and a third component C 102C (e.g., a heavy boiling fraction). The light boiling fraction A (first component) leaves the DWC at the top (after passing through a condenser (not shown)), while the intermediate boiling fraction B (second component) leaves the DWC in the side draw, and the heavy boiling fraction C (third component) leaves the DWC at the bottom. The multi-component feed is separated by a first separation section 120 (having a rectifying section RF and a stripping section SF) on the feed side into vapor 130 comprising the first and second component 102A and 102B, and liquid 140 comprising the second and third component 102B and 102C. A partition 160 separates the first separation section 120 on the feed side from a second and third separation section 180 and 180', respectively, on the intermediate product draw side.

The second separation section 180 on the side draw (product) side has a stripping section SP between the side draw and the top of the partition 160, and a rectifying section RP between the top of the column and the top of the partition 160. The predominant function of the stripping section SP is to remove the light boiling fraction A from the intermediate boiling fraction B. This stripping section is typically unable to separate the heavy boiling fraction C from the intermediate boiling fraction B, so that any C that descends from the top of the partition into side draw section will end up as an impurity in the intermediate boiling fraction of the draw side. Likewise, the rectifying section RP' on the side draw side removes the heavy boiling fraction C from the intermediate boiling fraction B. This (lower) rectifying section RP' is typically unable to separate the light boiling fraction A from the intermediate boiling fraction B, so any light boiling fraction that ascends from the bottom of the partition will end up as an impurity in the intermediate boiling fraction B. It is therefore important that excessive light boiling fraction will not reach the product side below the partition 160.

Above the top of the partition 160 is a rectifying section RP that rectifies the vapors ascending from both the feed side and the and the product side to remove the intermediate boiling fraction from the light boiling fraction. Similarly, below the bottom of the partition is a stripping section SP' that strips liquid descending from both the feed side and the product side to remove the intermediate boiling fraction from the heavy boiling fraction.

A differential vapor pressure cell 150 is thermally coupled to the divided wall column at a level that is between the point at which the feed enters the DWC and a level corresponding to the lower end of the partition 160. The DVP cell 150 may optionally also be disposed at a level identical or below a level corresponding with the lower end of the partition (shown in phantom). A control element 170 receives a signal from DVP cell 150 and regulates a process parameter in the DWC 100 (e.g., temperature via the reboiler RB).

It is generally contemplated that all known thermally coupled distillation systems separating an at least ternary feed are suitable in conjunction with the teachings presented herein, an especially contemplated distillation systems include divided wall columns with one separation section on one side of the separator (ie., the feed side) and at least and more typically two separation sections on the other side of the separator (i.e., the side draw side). Exemplary appropriate DWC include those described in U.S. Pat. No. 2,471,134 to Wright, Triantafyllou and Smith [The design and optimization of filly thermally coupled distillation columns. *Trans I. Chem. E*, Vol 70, Part A (1992), pages 118-132], Douglas [Conceptual Design of Chemical Processes. McGraw Hill, New York], Mutalib and Smith [operation and control of dividing wall distillation columns—Part I. *Trans I. Chem. E*, Vol 76, (1998), pages 308-318], Agrawal and Fidkowski [More operable arrangements of fully thermally coupled distillation columns. AICHE J. Vol 44, No 11 (1998), pages 2565-2568], Vaughan and Hahn [Sasol's 1-octene process; Paper presented at Achema 2000, May 22, 2000, Frankfurt, Germany], Becker et al. [The world's larges partitioned column with trays. *Linde Reports on Science and Technology* 62 (2000), pages 42-48], or Kolbe et al. [Partitioned distillation column. Paper presented at Achema 2000, May 24, 2000, Frankfurt, Germany]. Further commercially available configurations also include those from Sumitomo Heavy Industries [Column-in-column™ configuration].

Moreover, the number and configuration of separators may vary considerably, and it is contemplated that depending on the number of desired purified product streams (or the number of components with distinct boiling points/ranges in the feed), the DWC may include one, two, or more separators. For example where the DWC has a feed with 8 components, it is contemplated that the DWC may have three separators as described by G. Kaibel [Distillation columns with vertical partitions. *Chem. Eng. Technol.* 10 (1987), pages 92-98]. In another example, suitable DWC may have a modified separator that separates two feed streams with different composition as described by Schultz et al. [Design and control of a dividing wall distillation column for the fractionation secion in the Pacol enhancement process. Presentation at the 2001 Spring AIChE National Meeting, April 2001].

Thus, it should be recognized that contemplated DWC may include at least two, and more typically at least three separation sections, each of which may comprise a rectification section and a stripping section. In a particularly preferred aspect, the separation section on the feed side receives the feed in a feed section between a rectification section and a stripping section, and vapor (e.g., comprising a light and an intermediate boiling product) exits from the top of the rectification section, while liquid (e.g., comprising an intermediate and heavy boiling product) exits from the bottom of the stripping section. It is further contemplated that the rectification section receives liquid from the second separation section (e.g., predominantly comprising intermediate boiling point product), while the stripping section further receives a vapor from the third separation section (e.g., predominantly comprising intermediate boiling point product).

It is further preferred that a second separation section receives the vapor (from the rectifying section of the first separation section) in a feed section that is located between a rectifying section and a stripping section, wherein the first component (e.g., light boiling point product) exits the rectifying section of the second separation section via a condenser. The second component exits the stripping section of the second separation section as a liquid via a side draw. Similarly, it is preferred that the third separation section (i.e., the separation section below the second separation section) receives the liquid (from the stripping section of the first separation section) in a feed section that is located between a rectifying section and a stripping section, wherein the second component (e.g., intermediate boiling point product) exits the rectifying section of the third separation section as a vapor and moves into the stripping section of the second separation section. The second component exits the stripping section of the second separation section as a liquid via a side draw, while the third component exits the stripping section of the third separation section at the base of the column. A reboiler is often used at the base of the column to supply vapor for the stripping section.

It is generally preferred that at least one, and more typically each of the separation sections of the DWC may be a tray-type or packed section, however, other configurations or internals are also contemplated. Depending on the type of feed, various absorbents may be used, and particularly suitable materials include hydrocarbon and polar solvents.

With respect to the feed it is contemplated that particularly suitable feeds include hydrocarbonaceous feeds that may comprise at least three (and even more) components with distinct boiling points/ranges. For example, especially contemplated feeds include a first, second, and third component, wherein first component comprises a $C_4$-fraction, the second component comprises a $C_5$-fraction and the third component comprises a $C_6$-fraction. Alternatively, suitable feeds include numerous hydrocarbon mixtures of linear or branched hydrocarbons between $C_2$ and $C_8$, and even higher.

In a preferred aspect of the inventive subject matter, the DVP cell is a commercially available DVP cell (e.g., Foxboro DVP cell, or Instrumentation.com A Shelby Jones Co.), which is filled with a reference liquid. Especially preferred reference liquids include those having a vapor pressure that is substantially identical (ie., no more than ±20% difference) to a predetermined vapor pressure of the liquid on the feed side at a location where the DVP cell is disposed. Consequently, it is especially preferred that the reference liquid is a sample of the desired tray composition. However, in alternative aspects, numerous reference fluids other than the desired tray composition are also appropriate and include single and multi-component liquids (which may or may not include hydrocarbons). Furthermore, the DVP cell need not be limited to a particular configuration or manufacturer, so long as contemplated DVP cells produce a signal that is proportional (linear, logarithmic, or otherwise) to a vapor pressure difference between a reference channel (in communication with the column) and a reference fluid (in the DVP cell or DVP cell assembly). Thus, suitable DVP cells may further include a signal transducer that translates a pressure difference in an electronic output. Exemplary contemplated DVP cells and DVP cell assemblies are described, for example, in U.S. Pat. No. 6,279,401 to Karas, U.S. Pat. No. 6,272,928 to Kurtz, U.S. Pat. No. 4,766,769 to Nudd, U.S. Pat. No. 5,357,808 to Fung et al., U.S. Pat. No. 5,583,294 to Karas, U.S. Pat. No. 5,656,782 to Powell, and U.S. Pat. No. 4,693,121 to Nudd, all of which are incorporated by reference herein.

One or more DVP cells are inserted in the column (i.e., are in thermal communication with the liquid or liquid components in the column on the feed side) and further coupled to one end of a differential pressure transmitter. The other end of the transmitter is coupled (typically directly connected) to the column at substantially the same level (i.e., no more than one meter vertical difference) as the DVP cell. However, where appropriate, the other end of the transmitter may also be coupled to the column at a level other than the level of the DVP cell. The resulting difference in pressure due to the difference in levels may then be corrected using computational models.

With respect to the position of the DVP cell it is contemplated that numerous positions are suitable and a particular position is generally determined by the component that is to be monitored at a particular location. For example, where undesired descent of a light boiling point fraction needs to be detected or monitored, it is generally preferred that the DVP cell is positioned on the feed side at a level below the point where the feed enters the column on the feed side and above a lower end of the partition (e.g., 2 or 3 trays above the bottom of the stripping section SF of the column on the feed side). Alternatively, the DVP cell may also be positioned at a level that is identical or below the lower end of the partition. In such configurations, substantially identical vapor pressure between the DVP cell and the tray in the column where the DVP cell is disposed will typically signal a satisfactory tray composition. A rise in tray vapor pressure relative to the reference liquid in the DVP cell signals an excessive presence of lights, while a fall in tray vapor pressure relative to the reference liquid in the DVP cell signals depletion of lights.

Such contemplated configurations are especially advantageous in a DWC, since it is a common occurrence that the concentration of lights below the level where the feed enters the column can be relatively small (ie., below 1%). Under such circumstances, known tray temperature measurements are typically insensitive to the small concentration of lights. To circumvent this problem, analyzers may be used. However, analyzers are expensive, tend to be unreliable, and exhibit relatively long lag times, thereby rendering economically reasonable control difficult, if not impossible. Moreover, even if there is a potentially suitable control temperature in a DWC process, the configuration of the stripping section on the feed side is typically such that a temperature probe would be in relatively close proximity to the feed inlet where temperatures are known to fluctuate significantly with feed changes. Thus, it should be particularly recognized that a DVP cell provides a means of reliably and economically measuring compositions closer to the bottom of the partition, and even below it, where composition control is most desirable.

In other examples, where it is desired that rise of a high boiling point fraction needs to be monitored or controlled, contemplated DVP cells may be positioned on the feed side at a level above a point where the feed enters the column on the feed side and below the upper end of the partition. Alternatively, the DVP cell may also be positioned at a level that is identical or above the upper end of the partition. Still further it is contemplated that multiple DVP cell may be positioned in the DWC on various levels of one or both sides and assist or replace at least one temperature probe. Consequently, it is contemplated that a DVP may be positioned on the feed side and/or the product side (typically opposite the feed side), and at a level above and/or below the point where the feed enters the DWC. Thus, it should further be particularly appreciated that contemplated DVP cells will have a significantly greater sensitivity to composition changes in the tray than commonly used temperature controllers, and it is consequently contemplated that the use of a DVP cell allows for fast response, provides an accurate measurement in ternary or higher systems.

It is further contemplated that one or more of contemplated DVP cells are in operational communication (e.g., electronic, hydraulic, and/or mechanic communication) with a control element that receives a signal from the differential vapor pressure cell (or DVP cell transducer), wherein the control element regulates a process parameter in the divided wall column. Numerous control elements for DWC are well known in the art, and all of the known control elements are considered suitable for use herein. However, particularly preferred control elements include the control panel (or software) from which the operation of the DWC is controlled. Consequently, contemplated process parameters may vary considerably, however, especially preferred process parameters include temperature (e.g., tray temperature), product flow (e.g., first, second or third component), internal flow (e.g., reflux, internal reflux to feed section, and/or internal reflux to product section), reboiler load, and condenser load. In a particularly preferred aspect of the inventive subject matter, the control element regulates the process parameter when about 0.02% (mol) to about 5% (mol) of the first component is present at the location where the differential vapor pressure cell is positioned.

Thus, it should be recognized that DVP cells may be advantageously employed in separation of at least ternary feeds (i.e., feeds with at least three components having distinct boiling points/ranges). Moreover, it should be recognized that contemplated configurations are particularly useful where the DVP cell monitors/detects the presence of a light component on the feed side in a DWC at a level that is below the level of the feed, more typically between the level of the feed and the bottom of the partition, and in some cases even below the bottom of the partition. Moreover, while it is generally preferred that DVP cells may be employed as sensors for control of at least one process parameter, it should also be recognized that contemplated DVP cells may be used to guide tower operation.

Consequently, a method of operating a plant comprises a step in which a divided wall column is provided that includes a separation section on a feed side that receives a feed comprising at least a first component, a second component, and a third component. In another step, the feed is separated in the separation section on the feed side into a vapor that comprises the first and the second component, and a liquid that comprises the second and the third component, and in yet another step, a differential vapor pressure cell is coupled to the divided wall column at a level below a point where the feed enters the column on the feed side. In a still further step, a concentration of the first component is measured using the differential vapor pressure cell. With respect to the DWC, the separation sections, the feed, the DVP cell, the same considerations as described above apply.

Thus, specific embodiments and applications of improved distillation systems have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of operating a plant comprising:
   providing a divided wall column that has a partition and comprising a separation section on a feed side that receives a feed comprising at least a first component, a second component, and a third component, wherein the partition separates the feed side from a side product side;
   separating the feed in the separation section on the feed side into a vapor that comprises the first and the second component, and a liquid that comprises the second and the third component;
   coupling a differential vapor pressure cell to the divided wall column at a level below a point where the feed enters the divided wall column on the feed side; and
   measuring a concentration of the first component at the level below the point where the feed enters the column using the differential vapor pressure cell.

2. The method according to claim 1 wherein the differential vapor pressure cell is positioned on the feed side at a level below a point where the feed enters the column on the feed side and above a lower end of the partition.

3. The method according to claim 1 wherein the differential vapor pressure cell is positioned at a level that is identical or below the lower end of the partition.

4. The method according to claim 1 wherein the differential vapor pressure cell comprises a reference substance that has a vapor pressure that is substantially identical to a predetermined vapor pressure of the feed at a location where the differential vapor pressure cell is disposed.

5. The method according to claim 4 further comprising a control element that receives a signal from the differential vapor pressure cell, wherein the control element regulates a process parameter in the divided wall column.

6. The method of claim 5 wherein the process parameter is temperature.

7. The method of claim 5 wherein the control element regulates the process parameter when about 0.02% (mol) to about 5% (mol) of the first component is present at the location where the differential vapor pressure cell is positioned.

8. The method of claim 7 wherein the feed comprises a hydrocarbonaceous feed.

9. The method of claim 8 wherein the first component comprises a $C_4$-fraction, the second component comprises a $C_5$-fraction and the third component comprises a $C_6$-fraction.

10. The method of claim 1 wherein the divided wall column further comprises a second separation section and a third separation section, wherein the second separation section receives the vapor that comprises the first and the second component and wherein the third separation section receives the liquid that comprises the second and the third component.

* * * * *